(12) United States Patent
Smith

(10) Patent No.: US 7,938,443 B1
(45) Date of Patent: May 10, 2011

(54) SHIPPING-SAFE INFLATOR FOR AN AIRBAG MODULE

(75) Inventor: Bradley W. Smith, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/859,955

(22) Filed: Aug. 20, 2010

(51) Int. Cl.
*B60R 21/26* (2006.01)

(52) U.S. Cl. ......... 280/736; 280/738; 280/740; 280/741

(58) Field of Classification Search .................. 280/736, 280/738, 739, 740, 741, 742
See application file for complete search history.

(56) References Cited

U.S. PATENT DOCUMENTS

| | | | |
|---|---|---|---|
| 3,528,681 A | 9/1970 | Ekstrom | |
| 3,602,526 A | 8/1971 | Brawn | |
| 5,660,412 A | 8/1997 | Renfroe et al. | |
| 5,752,715 A * | 5/1998 | Pripps et al. | 280/740 |
| 5,848,803 A * | 12/1998 | Tonooka et al. | 280/740 |
| 6,149,192 A * | 11/2000 | Swann et al. | 280/740 |
| 6,183,007 B1 * | 2/2001 | Steffens et al. | 280/736 |
| 6,325,409 B1 | 12/2001 | Fischer | |
| 6,820,898 B2 | 11/2004 | Dinsdale et al. | |
| 6,854,763 B2 | 2/2005 | Dinsdale et al. | |
| 6,871,872 B2 * | 3/2005 | Thomas | 280/736 |
| 6,877,771 B2 | 4/2005 | Weber | |
| 6,908,104 B2 | 6/2005 | Canterberry et al. | |
| 7,007,610 B2 | 3/2006 | Karlin et al. | |
| 7,380,819 B2 * | 6/2008 | Fricke et al. | 280/736 |
| 2003/0090095 A1 * | 5/2003 | Takahara | 280/740 |
| 2003/0197357 A1 * | 10/2003 | Heigl et al. | 280/736 |
| 2005/0067823 A1 * | 3/2005 | Hayashi et al. | 280/742 |
| 2006/0076762 A1 | 4/2006 | Nakayasu | |
| 2007/0063489 A1 | 3/2007 | Dinsdale et al. | |

* cited by examiner

*Primary Examiner* — Toan C To
(74) *Attorney, Agent, or Firm* — Sally J. Brown; Madson IP, P.C.

(57) ABSTRACT

An inflator capable of directing inflation gas into the cushion of an airbag module is thrust neutral during shipping, handling and installation. The inflator's thrust-neutral feature can be rendered inoperable for use with the airbag module. A thrust-balancing portion of the inflator has a circumferentially continuous sidewall that encloses an elongated passageway and has a proximal end configured to receive inflation gas from the inflator and a distal end configured to release a primary portion of the inflation gas into the cushion. In the event of unintended discharge during shipping or handling, an elongated secondary discharge aperture formed through the sidewall releases to the exterior of the thrust-balancing portion a secondary portion of the inflation gas that imposes thrust on the inflator directed oppositely from thrust imposed by release of the primary portion of the inflation gas stabilizing the inflator during shipping, handling and installation. The secondary discharge aperture includes a nonlinear slot formed through the sidewall partially circumscribing a deflection vane that tends to pivot outwardly of the sidewall in response to inflation gas inside the passageway, directing the secondary portion of the inflation gas away from the distal end of the sidewall.

25 Claims, 4 Drawing Sheets

SHIPPING-SAFE INFLATOR FOR AN AIRBAG MODULE

BACKGROUND OF THE INVENTION

1. Field of the Invention

The present invention relates to vehicle passenger safety modules that use pressurized gas from an inflator to deploy an airbag between passengers and the interior of a vehicle in the event of a collision. In particular, the present invention pertains to thrust neutral diffuser/gas guides in an inflator for shipping and handling safety.

2. Background

A typical airbag for a vehicle passenger safety module includes an inflation portion that captures pressurized gas from an inflator, thereby becoming a gas-filled cushion interposed between a vehicle occupant and the interior vehicle surfaces surrounding that occupant. The inflator is ignited electrically in response to a momentum monitor carried in the vehicle.

The inflator has a discharge end that emits pressurized gas into the airbag. An airbag inlet portion directs pressurized gas from the inflator in directions and in quantities that are optimally suited to efficiently inflate the airbag cushion. This sleeve-like inlet portion of the airbag communicates with the inflation portion of the airbag cushion. When the elements of a vehicle passenger safety module are assembled in a vehicle, the inlet portion of the airbag is advanced over and secured to the inflator.

The release of inflation gas from the inflator imposes a substantial amount of reactive thrust, requiring the assembly of the inflator and airbag inlet portion to be securely restrained in the vehicle in which the assembly is employed. The inflation of the airbag cushion neutralizes most of the directional thrust, and the restraint that secures the inflator to the vehicle absorbs the remainder of any thrust.

The thrust caused by igniting the inflator is significant, and can cause an inflator to become a dangerous projectile if not restrained or rendered thrust neutral. Accordingly, if an unrestrained inflator is unintentionally ignited during shipping, handling, or installation an unsafe situation can occur.

Typically, during shipping and handling, before the installation of the assembly in a vehicle, physical restraint against the effects of reactive thrust is absent. As a result, unless the inflator is thrust neutral, the unintended discharge of inflation gas from the inflator can present serious safety concerns.

Hence, it would be an advance if an inflator could be thrust neutral during shipping, handling, and installation, but provide desired inflation characteristics during deployment of a fully-installed airbag module. It would be a particular advance if the inflator could provide a shipping-safe, thrust-neutral feature and desired deployment characteristics without structural modification to the inflator between shipping and deployment.

BRIEF SUMMARY OF THE INVENTION

According to one aspect of the present invention, an inflator is provided for directing inflation gas into the cushion of an airbag module to protect an occupant of a vehicle from impact. The inflator includes a proximal end, a distal end, and a thrust-balancing portion. The distal end is configured to release inflation gas into the cushion. The inflation gas is released from the distal end of the inflator through a primary discharge aperture. The thrust-balancing portion is disposed between the proximal and the distal ends of the inflator. The thrust-balancing portion is operational during shipping and handling prior to installation and provides gas guides configured to release to the exterior of the inflator a portion of the inflation gas in the event of an inadvertent discharge of the inflator. That release of inflation gas imposes on the inflator a thrust that is directed oppositely from the thrust imposed on the inflator the release of the inflation gas caused by inadvertent discharge. Typically, the proximal end, the distal end, and the thrust-balancing portion of the gas guide are integrally formed.

In a preferred embodiment, the transverse cross-sectional area of the interior of the thrust-balancing portion of the inflator is substantially unchanged between the proximal and distal ends of the inflator, and the tip of the distal end of the inflator remote from the thrust-balancing portion tapers radially inwardly to the primary discharge aperture. As a result, in the event of inadvertent discharge, a retrograde back pressure to the flow of the inflation gas through the inflator arises in the distal end of the inflator and contributes to the release of the portion of the inflation gas from the thrust-balancing portion of the inflator.

The interior of the thrust-balancing portion of the inflator communicates with the exterior of the inflator through one or more gas guides formed as elongated secondary discharge apertures through a sidewall of the thrust-balancing portion of the inflator. Each secondary discharge aperture can be longitudinally aligned with the thrust-balancing portion of the inflator. A deflection vane is disposed in each secondary discharge aperture and secured to the thrust-balancing portion of the inflator at the end of the secondary discharge aperture located closest to the distal end of the inflator. Typically, the longitudinal and transverse cross-sectional configurations of the deflection vane are substantially similar to the longitudinal and transverse cross-sectional configurations of the sidewall of the thrust-balancing portion of the inflator at the secondary discharge aperture, and the deflection vane is integrally formed with the sidewall of the thrust-balancing portion of the inflator. In response to the inflation gas inside the inflator, the deflection vane tends to pivot outwardly from the thrust-balancing portion of the inflator about the end of the secondary discharge aperture located closest to the distal end of the inflator.

In another aspect of the present invention, an inflator of the type discussed above includes an elongated circumferentially continuous sidewall enclosing a correspondingly elongated passageway and having proximal and distal ends. The proximal end of the sidewall is configured to receive inflation gas from the inflator, and an end cap on the distal end of the sidewall terminates the longitudinal extent of the passageway. A primary discharge aperture configured to release the inflation gas into the cushion is formed through the end cap. An elongated secondary discharge aperture is formed through the sidewall intermediate the proximal and distal ends thereof. The secondary discharge aperture is so configured to release to the exterior of the inflator a portion of the inflation gas that in turn imposes on the inflator a thrust directed oppositely from the thrust imposed on the inflator by the inadvertent release of the inflation gas.

The secondary discharge aperture results from a nonlinear slot with extreme first and second ends that is formed through the sidewall partially circumscribing a deflection vane portion of the sidewall. The slot exhibits a substantially uniform width between the first and second ends thereof. The deflection vane portion of the sidewall directs a portion of the inflation gas away from the distal end of the sidewall. In response to pressure of the inflation gas inside the passageway, the deflection vane tends to pivot (or deflect) outwardly of the sidewall about along a bending axis extending between the first and second ends of the slot. The bending axis is oriented transverse of the passageway between the deflection vane portion of the sidewall and the end cap.

As described, when the thrust-balancing portion of the inflator is unrestrained, the inflator is thrust neutral and safe for shipping and handling. However, once the thrust-balancing portion is restrained such as by a strap, band, clamp or the like, the thrust-neutral feature is rendered inoperable and the inflator is ready for use to deploy an airbag cushion.

Accordingly to yet another aspect of the present invention, an airbag module for protecting an occupant of a vehicle from impact includes an inflatable cushion and an inflator capable of producing pressurized inflation gas. The inflator includes a proximal end that is configured to receive inflation gas, a distal end that is configured to release the inflation gas into the cushion, and a thrust-balancing portion of the inflator disposed between the proximal and distal ends of the inflator. The proximal end, the distal end, and the thrust-balancing portion of the inflator are integrally formed and are of substantially equal cylindrical cross-sectional area. The distal end of the inflator remote from the thrust-balancing portion tapers radially inwardly to a primary discharge aperture of substantially smaller cross-sectional area than the transverse cross-sectionals area of the interior of the thrust-balancing portion of the inflator.

Although a plurality of elongated secondary discharge apertures are formed through the sidewall of the thrust-balancing portion of the inflator and may be uniformly-spaced at locations thereabout, these secondary discharge apertures, which communicate between the interior and the exterior of the thrust-balancing portion of the inflator, may be rendered inoperable by securing a strap, band, or clamp about the thrust-balancing portion. In this way, each deflection vane that extends into the secondary discharge aperture is secured so not to bend or deflect during deployment.

The strap, band or clamp may be part of the attachment to the vehicle used during installation or it may be a separate strap, band, or clamp or the like that disables the thrust-neutral feature. When the airbag is attached to the inflator so as to disable the thrust-neutral feature, the attached airbag serves to render the assembly relatively thrust neutral so that the thrust-neutral feature is not needed to make the assembly shipping safe. For example, in some instances, the airbag is secured to the inflator for shipping so that the airbag module is shipped as an assembled unit. In this case, the clamp, such as an Oetiker clamp, may be used to secure the airbag to the inflator and disable the thrust-neutral feature. When shipping an assembled airbag module (i.e., the inflator with an airbag attached), it is preferred that the strap, band, or clamp or the like that disables the thrust-neutral feature is made of a meltable material in case of fire. In the event of a fire during shipping, the airbag is likely to burn before the inflator ignites. Hence, if the strap, band, or clamp is made of a meltable material such as fusible alloys, a polymer-based composite, or plastic and melts or burns away before the inflator ignites, the restraint melts away and the thrust-neutral feature becomes operable so that the inflator will not become a dangerous projectile.

BRIEF DESCRIPTION OF THE SEVERAL VIEWS OF THE DRAWINGS

In order that the manner in which the above-recited and other features and advantages of the present invention are obtained will be readily understood, a more particular description of the present invention briefly described above will be rendered by reference to specific embodiments thereof which are illustrated in the appended drawings. Understanding that these drawings depict only typical embodiments of the present invention and are not therefore to be considered to be limiting of scope thereof, the present invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in FIGS. 1-5, is not intended to limit the scope of the invention, as claimed, but is merely representative of presently preferred embodiments of the invention.

Figure 1:
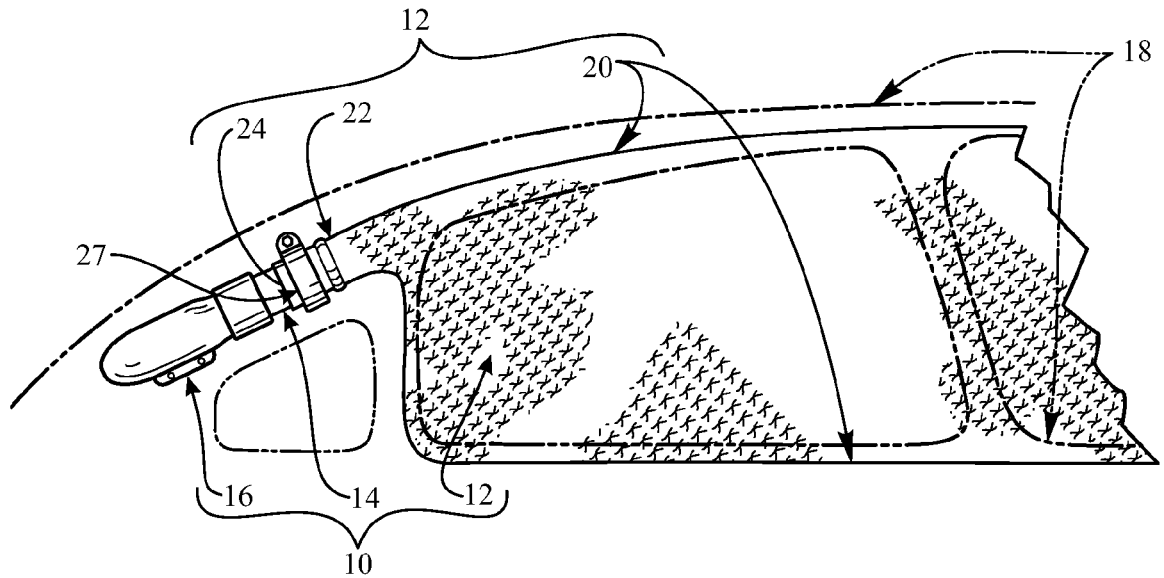
FIG. 1 is an elevation view, superimposed against a profile in phantom of the side windows of a typical passenger vehicle, of an inflated curtain cushion for a vehicle passenger safety airbag module attached to an inflator embodying teachings of the present invention.

FIG. 1 is an elevation view of a vehicle passenger safety module 10 that includes an inflated curtain airbag 12 that communicates with an inflator 16 having a thrust-balancing portion 14. For perspective, these elements of safety module 10 are superimposed against a profile in phantom of a side of a typical passenger vehicle 18. Airbag 12 includes an inflation portion 20 that becomes a protective cushion by capturing pressurized inflation gas from inflator 16, but airbag 12 also includes a sleeve-like inlet portion 22 that communicates with inflation portion 20. The open end 24 of inlet portion 22 has been advanced over a distal end of inflator 16 and its thrust-balancing portion 14 that, being thereby obscured by inlet portion 22, is not visible in FIG. 1.

Figure 2:
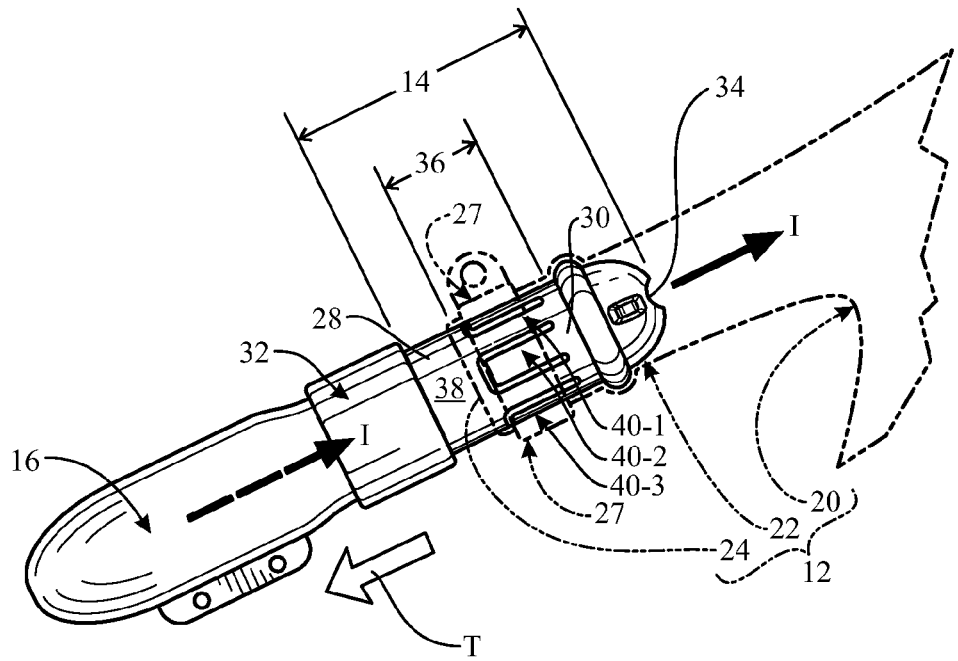
FIG. 2 is an enlarged view of the inflator and the inventive inflator of FIG. 1 showing the attachment to the airbag in phantom lines.

Inflator 16 is secured to the interior of passenger vehicle 18 by an attachment strap 27, as best shown in FIG. 2. Inlet portion 22 of airbag 12 can be secured by the attachment strap 27 about the exterior of inflator 16. While FIG. 2 shows the attachment strap 27 as encircling the thrust-balancing portion 16, it should be understood that any suitable attachment strap, band, clamp or the like can be used in lieu of the attachment strap 27 so long as it both secures the inlet portion 22 about the inflator 16 and restrains the thrust-balancing portion 16 from allowing the release of inflation gas to escape to the exterior of the airbag 12.

Pressurized inflation gas from inflator 16, in response to a crash situation signal, is released through the end of inflator 16, filling inflation portion 20 of airbag 12 into a protective cushion. The inflation portion 20 is filled with inflation gas without any appreciable loss of inflation gas through the thrust-balancing portion 14 and without any appreciable thrust balancing.

FIG. 2 is an enlarged view of inflator 16 with its thrust-balancing portion 14 and attachment strap 27. To more clearly reveal exterior features of thrust-balancing portion 14, attachment strap 27 is presented in phantom overlying in part the exterior of thrust-balancing portion 14. Thrust-balancing portion 14 is a tubular structure having a proximal end 28 that is positioned adjacent to an inflation gas outlet of inflator 16 and a distal end 30 that is remote therefrom. Distal end 30 of thrust-balancing portion 14 is shown extending into open end 24 of inlet portion 22 of airbag 12, which in FIG. 2 is also shown in phantom. Proximal end 28 of thrust-balancing portion 14 may be secured for fluid communication with the stored inflation gas of inflator 16 by a coupling 32. In this manner, the thrust-balancing portion 14 can receive pressurized inflation gas I from inflator 16 and directs inflation gas I into airbag 12. This is suggested by the correspondingly labeled arrows in FIG. 2.

Inflation gas I from inflator 16 is released into airbag 12 through a primary discharge aperture 34 in distal end 30 of inflator 16. The release of inflation gas I correspondingly imposes on inflator 16 a reactive thrust T that is directed away from primary discharge aperture 34. Once safety module 10 is assembled and installed in passenger vehicle 18, this reactive thrust T is constrained by attachment strap 27 so that the thrust-neutral feature of the inflator 16 is rendered inoperable. Prior to that installation, however, the unintended discharge of inflation gas I from inflator 16 can present safety risks.

Figure 3A:
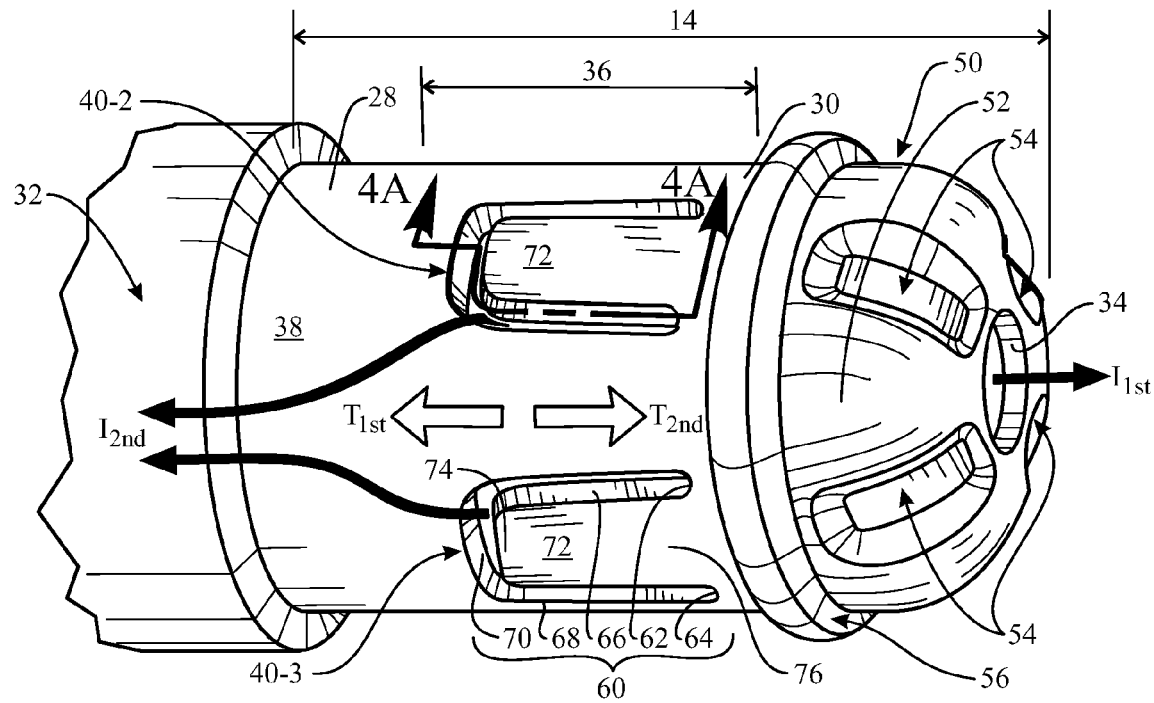
FIG. 3A is an enlarged perspective view of the inventive inflator of FIG. 2, partially cut away and reduced in longitudinal dimension, with side apertures of the inflator in a first mode of operation.

As shown by way of overview in FIG. 2 and in greater detail in FIG. 3A, according to teachings of the present invention, thrust-balancing portion 14 includes a gas-releasing portion 36 located intermediate proximal end 28 and distal end 30 thereof that reduces the risks of unintended discharge. FIG. 3A is an enlarged perspective view of thrust-balancing portion 14 unsecured to passenger vehicle 18 to better illustrate the features of a presently preferred embodiment of the invention. In this unsecured mode, the inflator 16 is shown as it may appear during shipping or handling prior to attachment to a vehicle 18. Therefore, in FIG. 3A, the gas-releasing portion 36 of thrust-balancing portion 14 is not obscured, as in FIG. 2, by any portion of attachment strap 27.

The thrust-balancing portion 14 provides safety when the inflator 16 is not restrained, as for example by attachment strap 27 or some other strap, band, or clamp. Under those conditions, the gas-releasing portion 36 performs two functions relative to inflation gas I received into thrust-balancing portion 14. First, thrust-balancing portion 14 directs a primary portion $I_{1st}$ of inflation gas I received from inflator 16 to distal end 30 of thrust-balancing portion 14 for discharge therefrom. This imposes on the inflator 16 a reactive primary thrust $T_{1st}$. Also, the gas-releasing portion 36 of thrust-balancing portion 14 releases to the exterior of inflator 16 a secondary portion $I_{2nd}$ of inflation gas I. Secondary portion $I_{2nd}$ of inflation gas I imposes on inflator 16 a corresponding reactive secondary thrust $T_{2nd}$ that is directed oppositely from primary thrust $T_{1st}$. Secondary thrust $T_{2nd}$ offsets some or all of primary thrust $T_{1st}$, thus rendering the inflator thrust neutral.

In this manner according to teachings of the present invention, an inflator 16 can be rendered stable in the case of an unintended release of pressurized inflation gas from inflator 16, even when being shipped or handled prior to installation in a passenger vehicle. Obviated thereby is the need for specialized restraining packaging for the inflators prior to installation in the passenger vehicle. Also, the safety of assembly personnel during the installation process is improved.

The release of secondary portion $I_{2nd}$ of the inflation gas from the gas-releasing portion 36 of thrust-balancing portion 14 occurs through one or more elongated secondary discharge apertures that are formed through the sidewall 38 of thrust-balancing portion 14 intermediate proximal end 28 and distal end 30 thereof. The secondary discharge apertures release secondary portion $I_{2nd}$ of the inflation gas to the exterior of inflator 16 in such a manner to impose on inflator 16 a thrust, such as secondary thrust $T_{2nd}$, that is directed toward primary discharge aperture 34 and opposite in direction to the thrust imposed by the primary portion $I_{1st}$ of the pressurized inflation gas I released in the event of unintended discharge through the primary discharge aperture 34.

While the configuration of individual secondary discharge apertures may vary, even within a single inflator 16, shown in FIG. 2 by way of example are a secondary discharge aperture 40-1, a secondary discharge aperture 40-2, and a secondary discharge aperture 40-3 that are identical in structure. Only secondary discharge aperture 40-2 and secondary discharge aperture 40-3 appear in FIG. 3A. Where a plurality of secondary discharge apertures are employed in a single inflator 16, the secondary discharge apertures may be positioned at uniformly-spaced locations about the circumference of the thrust-balancing portion 14 of the inflator 16. This is the case with the thrust-balancing portion 14 shown in FIGS. 2 and 3A.

A thrust-balancing portion 14 with a gas-releasing portion 36 incorporating teachings of the present invention may be installed in a passenger vehicle and secured to the inflation portion of an airbag 12 in a number of distinct relationships. Just one will be discussed below, however, those skilled in the art will understand alternative methods for securing the thrust-balancing portion 14 so that the thrust-neutral feature is disabled and deployment of the airbag 12 is not inhibited.

First, as shown in FIG. 2, attachment strap 27 may encircle secondary discharge aperture 40-1, secondary discharge aperture 40-2, and secondary discharge aperture 40-3. If the attachment strap 27 encircles thrust-balancing portion 14 at secondary discharge aperture 40-1, secondary discharge aperture 40-2, or secondary discharge aperture 40-3, outward deformations of sidewall 38 there may be prevented. If inlet portion 22 of airbag 12 is clamped against a secondary discharge aperture by an encircling retention strap which may or may not be the attachment strap 27, the release of secondary portion $I_{2nd}$ of inflation gas may be so minimized that the thrust-neutral feature is disabled and the clamping will not impair the deployment of inflation portion 20 caused by the release of primary portion $I_{1st}$ of inflation gas.

Returning to FIG. 3A, as thrust-balancing portion 14 is a tubular structure, thrust-balancing portion 14 is defined by sidewall 38, which is an elongated, circumferentially continuous structure that encloses a correspondingly elongated central passageway and has proximal and distal ends that correspond to proximal end 28 and distal end 30 of thrust-balancing portion 14. Proximal end 28 of thrust-balancing portion 14 and sidewall 38 may be secured to coupling 32 and is thus configured to receive inflation gas I from inflator 16, as shown in FIG. 2. Of course, in another embodiment, the thrust-balancing portion 14 may also be formed integral with the remainder of the inflator 16.

An end cap 50 on distal end 30 of thrust-balancing portion 14 and sidewall 38 terminates the longitudinal extent of the central passageway through thrust-balancing portion 14. Centrally formed through end cap 50 is primary discharge aperture 34 by which primary portion $I_{1st}$ of inflation gas is released from inflator 16 into airbag 12. The generally hemispherical outer surface 52 of end cap 50 is creased by a plurality of radially-outwardly extending recesses 54, each of which is aligned longitudinally of thrust-balancing portion 14 with one of the secondary discharge apertures located in gas-releasing portion 36 thereof. A raised collar 56 circumscribes thrust-balancing portion 14 at the junction between end cap 50 and sidewall 38.

The secondary discharge apertures of thrust-balancing portion 14 are elongated structures that extend entirely through sidewall 38 and thus communicate between the exterior of thrust-balancing portion 14 and the longitudinal passageway therewithin. Each secondary discharge aperture is in alignment with the longitudinal extent of thrust-balancing portion 14. Secondary discharge aperture 40-2 and secondary discharge aperture 40-3 depicted in FIG. 3A, are so configured that the release of parts of secondary portion $I_{2nd}$ of inflation gas has a specific intended effect on thrust-balancing portion 14. Each of the parts of secondary portion $I_{2nd}$ of inflation gas released through secondary discharge apertures of thrust-balancing portion 14 imposes on inflator 16 a desirable thrust that is directed oppositely from the thrust imposed on inflator 16 by the release of primary portion $I_{1st}$ of inflation gas through primary discharge aperture 34.

Figure 4A:
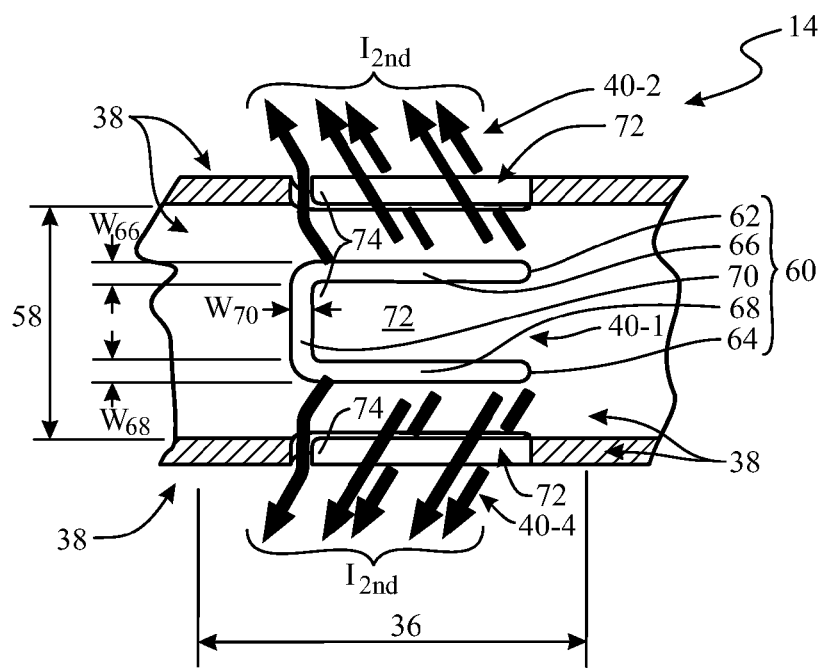
FIG. 4A is a cut away, longitudinal cross section of a side aperture of the inventive inflator of FIG. 3A taken along section line 4A-4A therein.

The structures of the secondary discharge apertures of thrust-balancing portion 14 are essentially identical, but the details of those structures will be explored by specific reference to secondary discharge aperture 40-3 in FIG. 3A and secondary discharge aperture 40-1 in FIG. 4A. Like reference numerals will be used to identify like structures in these and the others of the secondary discharge apertures of thrust-balancing portion 14.

In FIG. 4A, sidewall 38 of thrust-balancing portion 14 is shown in cross section enclosing a central passageway 58 that extends longitudinally through thrust-balancing portion 14. Secondary discharge aperture 40-1 appears in plan view flanked by secondary discharge aperture 40-2 and a secondary discharge aperture 40-4, which appear in an edge view.

Each of secondary discharge aperture 40-3 of FIG. 3A and secondary discharge aperture 40-1 of FIG. 4A includes a nonlinear slot 60 through sidewall 38. Slot 60 may, for example, be formed by electrostatic discharge machining of sidewall 38. Slot 60 extends from a first end 62 thereof to an extreme second end 64 thereof. Slot 60 assumes a generally U-shaped configuration with the open end of the U-shape thereof directed toward primary discharge aperture 34 as shown in FIG. 3A. Thus, slot 60 includes a generally linear first leg 66 adjacent to first end 62, a generally linear second leg 68 adjacent to second end 64, and a generally linear base 70 interconnecting in curved corners the ends of first leg 66 and second end 64 opposite from first end 62 and second end 64, respectively. Slot 60 exhibits a substantially uniform width between first end 62 and second end 64 thereof. Accordingly, the width $W_{66}$ of first leg 66 is substantially equal to the width $W_{68}$ of second leg 68, which in turn is substantially equal to the width $W_{70}$ of base 70 of slot 60.

Because of its overall shape, slot 60 partially circumscribes a deflection vane 72 that is essentially disposed inside secondary discharge aperture 40-3 of FIG. 3A and secondary discharge aperture 40-1 of FIG. 4A. Deflection vane 72 is secured to gas-releasing portion 36 of thrust-balancing portion 14 at the end of each secondary discharge aperture that is located closest to primary discharge aperture 34 in end cap 50 at distal end 30 of thrust-balancing portion 14. Accordingly, deflection vane 72 has a free end 74 at base 70 of slot 60 and a secured end 76 opposite therefrom between first end 62 and second end 64 of slot 60. Deflection vane 72 may be integrally formed with sidewall 38 in which case the longitudinal and transverse cross-sectional configurations of deflection vane 72 may conveniently be substantially similar to the longitudinal and transverse cross-sectional configurations, respectively, of sidewall 38 of thrust-balancing portion 14 at each respective secondary discharge aperture.

As suggested by the correspondingly labeled arrows in FIGS. 3A and 4A, slot 60 is so configured as to release parts of secondary portion $I_{2nd}$ of inflation gas to the exterior of inflator 16 through each of first leg 66, second end 64, and base 70 thereof. Secondary portion $I_{2nd}$ of inflation gas imposes thrust on inflator 16 that contributes to neutralizing the thrust imposed on inflator 16 by the release of primary portion $I_{1st}$ of inflation gas through primary discharge aperture 34.

Figure 3B:
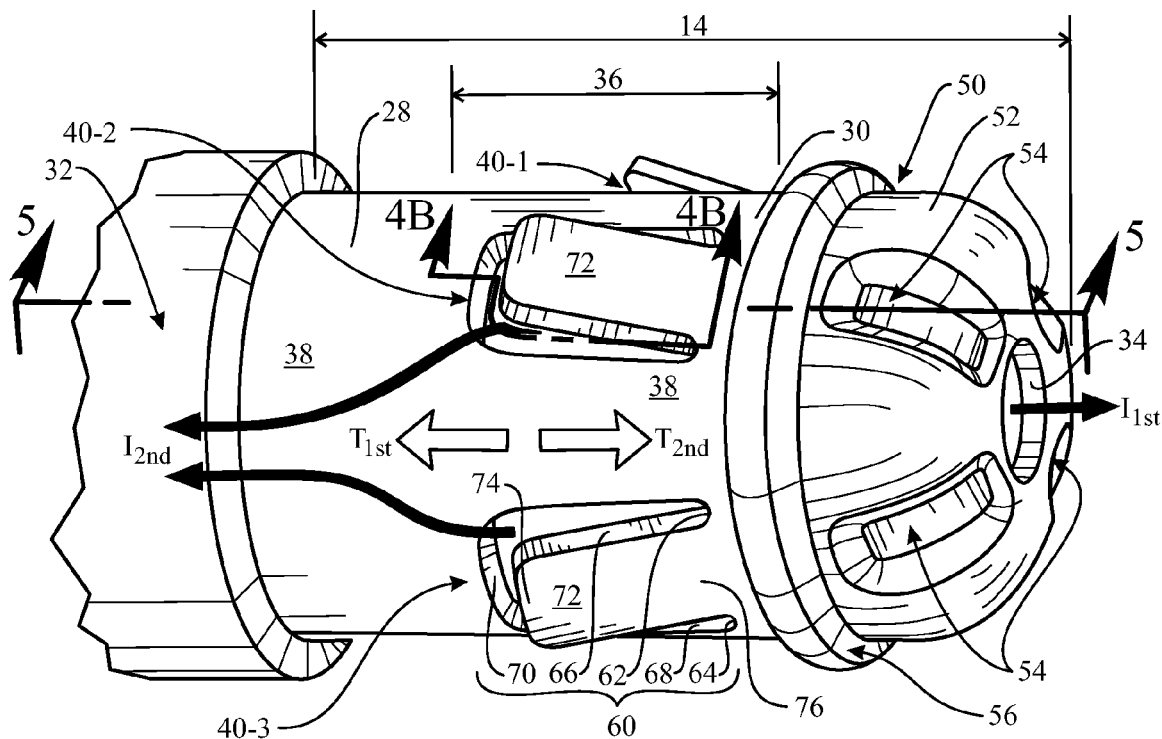
FIG. 3B is an enlarged perspective view of the inventive inflator of FIG. 2, partially cut away and reduced in longitudinal dimension, with side apertures of the inflator in a second mode of operation showing the inflation gas flow in the event of an inadvertent discharge.
Figure 4B:
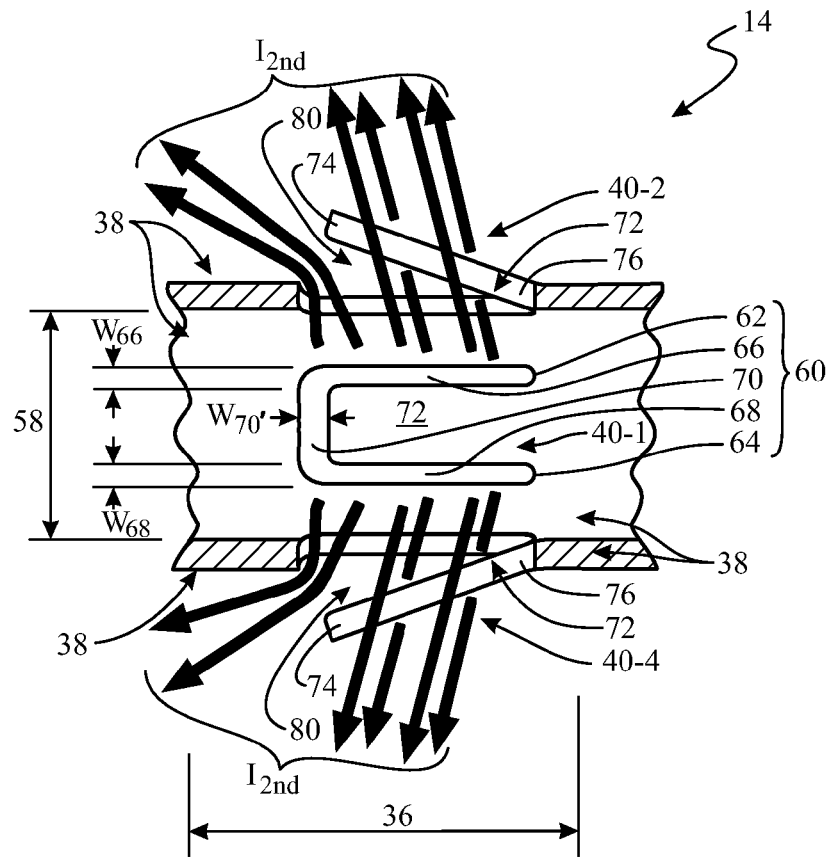
FIG. 4B is a cut away, longitudinal cross section of a side aperture of the inventive Inflator of FIG. 3B taken along section line 4B-4B therein.

Sidewall 38 at secondary discharge aperture 40-3 of FIG. 3A and at secondary discharge aperture 40-1 of FIG. 4A is urged outwardly by the passage of secondary portion $I_{2nd}$ of inflation gas through thrust-balancing portion 14. Deflection vane 72 in particular is susceptible to such forces. FIGS. 3B and 4B together illustrate a mode of secondary discharge aperture operation in which deflection vane 72 deforms during the release of parts of secondary portion $I_{2nd}$ of inflation gas through a corresponding secondary discharge aperture. Then, free end 74 of deflection vane 72 tends to pivot outwardly from sidewall 38 along a bending axis that extends between first end 62 and second end 64 of slot 60 at secured end 76 of deflection vane 72. The bending axis about which deflection vane 72 deflects from the longitudinal extent of thrust-balancing portion 14 between deflection vane 72 and end cap 50. Thus, in this mode of secondary discharge aperture operation, deflection vane 72 tends to assume an orientation extending outwardly from thrust-balancing portion 14.

This increases the overall size of the cross-sectional area through which the parts of secondary portion $I_{2nd}$ of inflation gas can escape to the exterior of thrust-balancing portion 14 at each associated secondary discharge aperture. A comparison of the plan views of secondary discharge aperture 40-1 in the first mode of secondary discharge aperture operation in FIG. 4A and in the second mode of secondary discharge aperture operation in FIG. 4B might appear to belie this conclusion. During secondary discharge aperture operation, width $W_{66}$ of first leg 66 of slot 60 and width $W_{68}$ of second leg 68 of slot 60 appear to remain substantially unchanged, while width $W_{70'}$ of base 70 of slot 60 in the deflected mode of secondary discharge aperture operation shown in FIG. 4B appears to be only slightly larger than width $W_{70}$ of base 70 of slot 60 in the undeflected mode of secondary discharge aperture operation shown in FIG. 4A. A comparison of the side views of secondary discharge aperture 40-2 or secondary discharge aperture 40-4 in each of FIGS. 4A and 4B, however, reveals that the outward pivoting of free end 74 of deflection vane 72 dramatically separates free end 74 of deflection vane 72 from the adjacent portion of sidewall 38 on the opposite side of base 70 of slot 60. Additionally, in the deflected mode of secondary discharge aperture operation shown in FIG. 4B, outward pivoting of deflection vane 72 gives rise to a wedge-shaped inflation gas lateral release window 80 between deflection vane 72 and the portions of sidewall 38 to either lateral side thereof.

Figure 5:
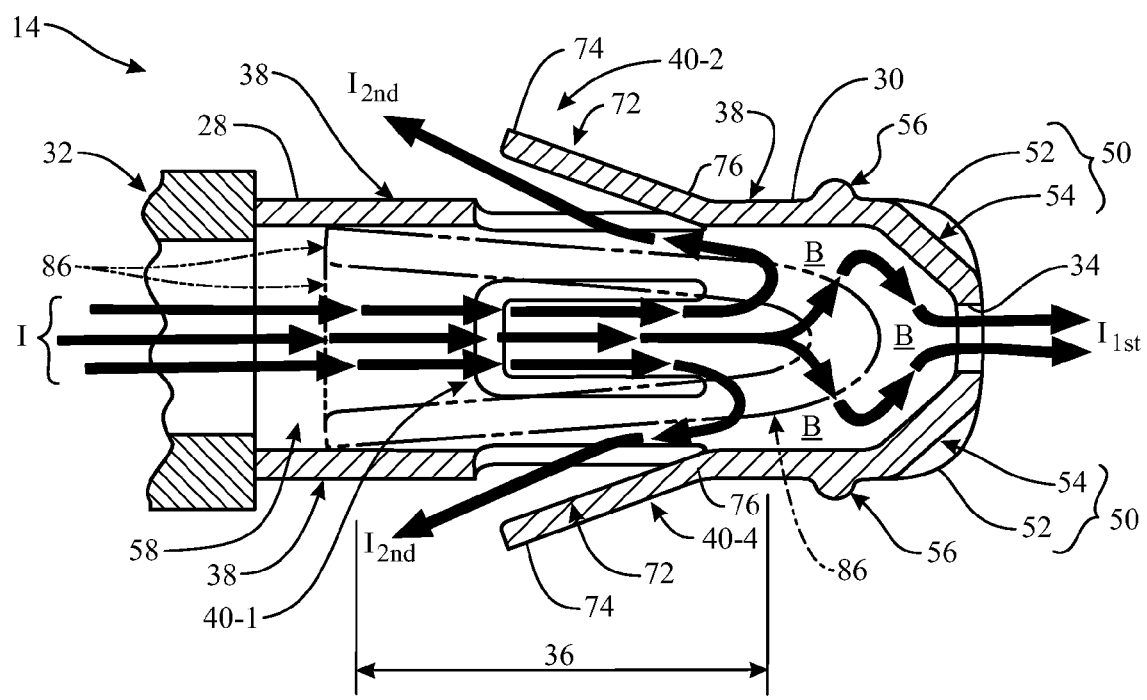
FIG. 5 is a partially cut away, longitudinal cross section of the inflator of FIG. 3B taken along section line 5-5 therein.

FIG. 5 is a longitudinal cross section of the entirety of the length of thrust-balancing portion 14 taken along section line 5-5 in FIG. 3B. FIG. 5 is thus more inclusive than FIG. 4B discussed above. FIG. 5 differs slightly from FIG. 4B, however, as in FIG. 5 the edge views of secondary discharge aperture 40-2 and secondary discharge aperture 40-4 included therein are taken through, rather than around, deflection vane 72 of each, which was the case in FIG. 4B.

In FIG. 5, inflation gas I enters passageway 58 in thrust-balancing portion 14 from coupling 32, while primary portion $I_{1st}$ of inflation gas is released from thrust-balancing portion 14 through primary discharge aperture 34, and parts of secondary portion $I_{2nd}$ of inflation gas are released therefrom through secondary discharge apertures, among which only secondary discharge aperture 40-1, secondary discharge aperture 40-2, as well as secondary discharge aperture 40-4 are shown. Lodged in passageway 58, interposed between coupling 32 and all outlets from thrust-balancing portion 14, is a generally conical, gas-permeable debris filter 86 shown in phantom. Debris filter 86 prevents particles produced by the ignition of inflator 16 in FIGS. 1 and 2 and entrained in inflation gas I from being ejected out of thrust-balancing portion 14 with either of primary portion $I_{1st}$ of inflation gas I or secondary portion $I_{2nd}$ of inflation gas I.

Proximal end 28, distal end 30, and gas-releasing portion 36 of thrust-balancing portion 14 may, as shown in FIG. 5, be integrally formed with each other. The transverse cross-sectional area of passageway 58 in gas-releasing portion 36 of thrust-balancing portion 14 is substantially unchanged between proximal end 28 and distal end 30 thereof. The interior of end cap 50 of thrust-balancing portion 14 tapers radially inwardly to primary discharge aperture 34, which accordingly is substantially smaller in cross-sectional area than the transverse cross-sectional area of the interior of thrust-balancing portion 14. Under such conditions, the passage of inflation gas I through thrust-balancing portion 14 gives rise to regions B of retrograde backpressure in the flow of inflation gas I. Regions B of retrograde backpressure contribute to the release of secondary portion $I_{2nd}$ of inflation gas through the secondary discharge apertures in gas-releasing portion 36 of thrust-balancing portion 14 in such a manner as to impart onto inflator 16 a reactive thrust that counteracts the reactive thrust imposed thereupon by the release of primary portion $I_{1st}$ of inflation gas. This tends to stabilize inflator 16 under all conditions of shipping, handling, and installation.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An inflator for directing inflation gas into the cushion of an airbag module, the inflator comprising:
   a thrust-balancing portion comprising:
   (a) a proximal end for receiving inflation gas from the inflator;
   (b) a distal end for releasing a primary portion of the inflation gas into the cushion, thereby imposing thrust on the inflator; and
   (c) a gas-releasing portion disposed between the proximal and the distal ends of the thrust-balancing portion, the thrust-balancing portion has an interior and in the event of unintended discharge of the inflator the gas-releasing portion releases to the exterior of the inflator a secondary portion of the inflation gas thereby imposing on the inflator a thrust directed oppositely from the thrust imposed on the inflator by the release of the primary portion of the inflation gas.

2. An inflator as recited in claim 1, wherein the transverse cross-sectional area of the interior of the thrust-balancing portion is substantially unchanged between the proximal and distal ends of the thrust-balancing portion.

3. An inflator as recited in claim 1, wherein:
   (a) the primary portion of the inflation gas is released from the distal end of the thrust-balancing portion through a primary discharge aperture of substantially smaller cross-sectional area than the transverse cross-sectional area of the interior of the thrust-balancing portion; and
   (b) a retrograde back pressure to the flow of the inflation gas through the gas guide arises proximate the distal end of the thrust-balancing portion and contributes to the release of the secondary portion of the inflation gas from the thrust-balancing portion of the inflator.

4. An inflator as recited in claim 3, wherein the tip of the distal end of the thrust-balancing portion tapers radially inwardly to the primary discharge aperture.

5. An inflator as recited in claim 1, wherein the interior of the thrust-balancing portion of the inflator communicates with the exterior of the inflator through an elongated secondary discharge aperture formed through a sidewall of the thrust-balancing portion.

6. An inflator as recited in claim 5, wherein the secondary discharge aperture is substantially U-shaped.

7. An inflator as recited in claim 5, wherein the thrust-balancing portion further comprises a deflection vane disposed in the secondary discharge aperture and secured to the thrust-balancing portion at the end of the secondary discharge aperture located closest to the distal end of the thrust-balancing portion.

8. An inflator as recited in claim 7, wherein the deflection vane is integrally formed with the sidewall of the thrust-balancing portion.

9. An inflator as recited in claim 7, wherein the deflection vane tends to pivot outwardly from the thrust-balancing portion about the end of the secondary discharge aperture located closest to the distal end of the thrust-balancing portion in response to the inflation gas inside the thrust-balancing portion.

10. An inflator as recited in claim 1, wherein the proximal end, the distal end, and the gas-releasing portion of the thrust-balancing portion are integrally formed.

11. An inflator as recited in claim 5, further comprising a restraint disposed about the gas-releasing portion to inhibit the release of the secondary portion of the inflation gas to the exterior of the inflator.

12. An inflator having an operational mode for directing inflation gas into the cushion of an airbag module and a thrust-neutral mode, the inflator having a thrust-balancing portion comprising:
   (a) an elongated circumferentially continuous sidewall enclosing a correspondingly elongated passageway and having proximal and distal ends, the proximal end of the sidewall for receiving inflation gas from the inflator;
   (b) an end cap disposed at the distal end of the sidewall terminating the longitudinal extent of the passageway;
   (b) a primary discharge aperture formed through the end cap for releasing a primary portion of the inflation gas from the inflator, such release of the primary portion of the inflation gas imposes thrust on the inflator; and (c) an elongated secondary discharge aperture formed through the sidewall intermediate the proximal and distal ends thereof, the secondary discharge aperture for releasing to the exterior of the inflator a secondary portion of the inflation gas thereby imposing on the inflator a thrust directed oppositely from the thrust imposed on the inflator by the release of the primary portion of the inflation gas when the inflator is in the thrust-neutral mode.

13. An inflator as recited in claim 12, wherein the secondary discharge aperture comprises a nonlinear slot with extreme first and second ends, said slot being formed through the sidewall partially circumscribing a deflection vane portion of the sidewall, the deflection vane portion of the sidewall directing the secondary portion of the inflation gas away from the distal end of the sidewall.

14. An inflator as recited in claim 13, wherein the deflection vane portion of the sidewall tends to pivot outwardly of the sidewall about along a bending axis extending between the first and second ends of the slot in response to pressure of the inflation gas inside the passageway when the inflator is in the thrust-neutral mode.

15. An inflator as recited in claim 14, wherein the bending axis is oriented substantially transverse of the passageway between the deflection vane portion of the sidewall and the end cap.

16. An inflator as recited in claim 12, further comprising a restraint disposed about the secondary discharge aperture to inhibit the release of the secondary portion of the inflation gas to the exterior of the inflator, thereby rendering the inflator into the operational mode.

17. An airbag module for protecting an occupant of a vehicle from impact, the module comprising:
(a) an inflatable cushion;
(b) an inflator capable of producing pressurized inflation gas; and
(c) the inflator having a thrust-balancing portion capable of directing inflation gas from the inflator into the cushion, the thrust-balancing portion comprising:
(i) a proximal end of the thrust-balancing portion for receiving inflation gas from the inflator;
(ii) a distal end of the thrust-balancing portion for releasing a primary portion of the inflation gas into the cushion and thereby imposing thrust on the inflator;
(iii) a gas-releasing portion of the thrust-balancing portion disposed between the proximal and distal ends of the thrust-balancing portion;
(iv) a plurality of elongated secondary discharge apertures formed through the sidewall of the thrust-balancing portion at uniformly-spaced locations thereabout, the secondary discharge apertures communicating between the interior and the exterior of the thrust-balancing portion; and
(v) a plurality of deflection vanes, each of the deflection vanes extending into a corresponding one of the secondary discharge apertures and being secured to the sidewall of the thrust-balancing portion at the end of the corresponding one of the secondary discharge aperture located closest to the distal end of the thrust-balancing portion, the plurality of the deflection vanes and the corresponding plurality of discharge apertures for releasing a secondary portion of the inflation gas to the exterior of the inflator and thereby to impose on the inflator a thrust directed oppositely from the thrust imposed on the inflator by the release of the primary portion of the inflation gas.

18. An airbag module as recited in claim 17, wherein the proximal end, the distal end, and the gas-releasing portion of the thrust-balancing portion are integrally formed and of substantially equal cylindrical cross-sectional area.

19. An airbag module as recited in claim 17, wherein the deflection vanes are integrally formed with the sidewall of the thrust-balancing portion, and the deflection vanes tend to assume an orientation extending outwardly from the thrust-balancing portion in response to pressure of the inflation gas inside the thrust-balancing portion.

20. An airbag module as recited in claim 17, wherein the primary portion of the inflation gas is released from the distal end of the thrust-balancing portion through a primary discharge aperture of substantially smaller cross-sectional area than the transverse cross-sectional area of the interior of the thrust-balancing portion.

21. An airbag module as recited in claim 17, wherein the inflatable cushion is secured to the thrust-balancing portion such that the inflatable cushion cover the secondary discharge apertures.

22. A thrust-neutral inflator for use in an airbag module, the inflator comprising:
a thrust-balancing portion providing a thrust-neutral feature comprising:
(a) a proximal end for receiving inflation gas from the inflator;
(b) a distal end for releasing a primary portion of the inflation gas from the inflator, thereby imposing thrust on the inflator; and
(c) a gas-releasing portion disposed between the proximal and the distal ends of the thrust-balancing portion, the thrust-balancing portion has an interior and provides the thrust-neutral feature in the event of unintended discharge of the inflator by allowing the gas-releasing portion to release to the exterior of the inflator a secondary portion of the inflation gas thereby imposing on the inflator a thrust directed oppositely from the thrust imposed on the inflator by the release of the primary portion of the inflation gas.

23. A thrust-neutral inflator as recited in claim 22, further comprising a restraint disposed about the gas-releasing portion to disable the thrust-neutral feature by inhibiting the release of the secondary portion of the inflation gas to the exterior of the inflator.

24. A thrust-neutral inflator as recited in claim 23, wherein the restraint melts or burns at a temperature lower than the temperature required to ignite the inflator.

25. A thrust-neutral inflator as recited in claim 23, wherein the restraint is an Oetiker clamp.

* * * * *